United States Patent [19]
Nowlin

[11] Patent Number: 5,470,160
[45] Date of Patent: Nov. 28, 1995

[54] CHECK PREPARATION METHOD AND APPARATUS INCORPORATING CHECK SUM PROOF ENTRY

[76] Inventor: Linda Nowlin, 16007 Yorkminister, Spring, Tex. 77379

[21] Appl. No.: 176,727

[22] Filed: Jan. 3, 1994

[51] Int. Cl.⁶ ....................................................... B41J 5/00
[52] U.S. Cl. .............................................. 400/105; 400/88
[58] Field of Search .......................... 400/106, 88, 103, 400/104, 105, 154, 154.4, 154.5, 155, 155.1; 101/93.05, 93.14

[56] References Cited

U.S. PATENT DOCUMENTS

| | | | |
|---|---|---|---|
| 4,624,588 | 11/1986 | Bivin | 400/105 |
| 4,991,983 | 2/1991 | Graverholt | 400/105 |
| 5,014,212 | 5/1991 | Smith | 400/104 X |

OTHER PUBLICATIONS

IBM Technical Disclosure Bulletin, vol. 26, No. 8, Jan. 1984.

*Primary Examiner*—Chris A. Bennett
*Attorney, Agent, or Firm*—Gunn & Associates

[57] ABSTRACT

A check printing method and apparatus are disclosed. To reduce proofing obligations, the present disclosure sets out a check printing apparatus. The apparatus is enhanced to print the payee name, date and check sum. The check sum is printed in accordance with this disclosure at a specified location in Arabic numerals of the modified MICR format and which numerals are readable by an MICR apparatus. A method of preparation of a check is likewise set forth.

17 Claims, 1 Drawing Sheet

CHECK PREPARATION METHOD AND APPARATUS INCORPORATING CHECK SUM PROOF ENTRY

BACKGROUND OF THE DISCLOSURE

The present disclosure is directed to check printing apparatus and a method of using the apparatus to enhance the printing of checks. This is best placed in context by review of the procedure by which checks are negotiated.

Typically, a depositor opens a checking account in an issuing bank and is provided with preprinted checks. Among other things, the preprinted checks include fields which encode several sets of important numbers. One of the important numbers is the bank number which is unique to the issuing bank. In addition to the bank number, there is an account number which identifies that particular customer or the account of the customer. The account number is important so that the debits and credits are properly allocated to the correct account. Another data is the check number. The check number is included so that the customer is able to correlate the check sum of the particular check with the check number so that the monthly statement can be reconciled both with the check number and amount in an organized fashion.

Deposits are made periodically and withdrawals are made by issuing checks. When the checks are presented to various merchants, those merchants typically deposit the presented checks of the customer along with checks of numerous other customers in their own account. By means of a network of check clearing routes, the checks are transferred between financial institutions. The issued check may be mailed across the country and is returned to the issuing bank through banking channels. As will be understood, suitable debits and credits are made so that the customers account is balanced daily to the remaining amount.

When the checks are transferred from a foreign bank, they are ultimately received at the issuing bank. Checks are then entered against the various accounts of that particular bank. This process is known as check proofing. It is necessary to encode certain data on the check so that proofing can be carried out. Because of the large number of checks received by a typical financial institution, the proofing department is a substantial undertaking, and involves numerous personnel. A very substantial and important step in the proofing department is the encoding of the check sum. The check sum is determined by the customer; for instance, the customer may elect to pay by means of check for goods and services received from all around the country. In the example given below, where the sum is $329.00 for purposes of description, assume that the bank depositor utilizing a preprinted check issues a check in the amount of $329.00 for satisfaction of some purchase. In that event, the check is received back at the issuing bank of that depositor and passes through proofing department. It is necessary to type the proof information on the face of the check. This is a step which requires hand labor.

The check sum is written on the check in two forms. The check sum is written in Arabic numerals. This however is not the controlling entry. While it is convenient and it is meant to be the same as the amount of the check, they are not always the same of legible handwriting or free of depositor error. When the bank customer issues a check, the check sum must be spelled out. Using the example of $329.00, the check requires an entry of $329.00. The personnel in the proof department must read the Arabic entry as mentioned, the handwritten sum entered above and encode the check sum on the face of the check.

The present disclosure is directed to a check printing apparatus which, in the hands of the depositor, enables the bank to reduce the labor and related activities necessary for proofing the avalanche of checks which are received on a daily basis.

Proofing at the bank is necessary to make the necessary deductions or additions to the accounts of the numerous customers at the bank. This is labor intensity. The labor is involved in typing the check sum for the third time on the face of the check. At the time of issuance, that number is entered twice by the depositor. The present system proposes that the depositor enter the amount a third time in the fashion to be described. The third entry is preferable made in the form of MICR ink. The preprinted check ordinarily includes the bank number, the check number, and the account number in MICR ink. This is ink which, while black and opaque, also includes sufficient ferrous metal materials to enable an MICR reader to recognize the characters. When the check is negotiated by the depositor, the check sum is the primary entry which is created in the proofing department so that the check can be posted to the account of the customer to enable the proper debits and credits to be made. Accordingly, substantially all the labor involved in the proofing department is related to the steps of entering the check sum in MICR ink.

One aspect of the present invention proposes a system in which the check, at the time it is issued, is encoded with the proper MICR entry. In other words, the check sum is located at the right location on the check for easy reading. Likewise, it is recorded in MICR ink so that the same equipment which read other fields of data can likewise recognize this data. This particularly finds advantage with a device which is provided by the Panasonic Corporation and is sold as Model KX-RC100. This particular device is known as the CPA or check printing accountant. It is able to write checks. It incorporates a calculator function which enables the various and sundry data on the check to be recorded and saved. Moreover, it also enables the capture of data regarding the check at the time it is actually printed. This equipment is able to print the payee and the check sum. The date likewise can be entered. All of this is entered at the appropriate locations on the blank check.

As a generalization, the check is laid out with a common format. Utilizing that format, the check is provided with a first blank which is for the date. A second field is the field in which the payee is entered. A third field is the Arabic entry of the sum, hereinafter the check sum. The fourth field is the check sum which is usually long hand or in a spelled out version. This provides conformance to the various codes determining legal rights and remedies with regards to bills, notes, checks, drafts, etc. The fifth field is an entry for any memo such as identification of a particular bill for a particular month. The sixth field is the check sum and it is the same value as the third and fourth fields. The sixth field however is like the third field in that it is preferable entered in Arabic form. However, the Arabic format for the sixth field is the MICR shaped characters which are readable by MICR reading equipment. In this instance, the ten symbols representing the ten numeric values are modified in shape so that they are nevertheless readable to the human eye and are also readable by MICR reading equipment. That equipment is provided, among others, by vendors such as the Burroughs firm. Burroughs' has provided a large share of the check proofing equipment in use by financial institutions in this country.

One aspect of the present disclosure is that a check writing system is set forth which reduces the proofing steps of the bank for the bank depositor. The depositor thus has only to perform this step to enable the bank to reduce the cost of providing its services. This enables the service charge to be reduced. By reduction of the service charge, the present system is able to provide the same banking services at a reduced expense.

Going now to another aspect of the present disclosure, the check is provided with a sixth field so that the MICR readable characters are included for the check sum. This is helpful at the time of proofing. It is printed typically on a wallet size check which is ideally processed by the CPA equipment mentioned above. The CPA equipment preferably prints what is known as a standard wallet check. This is a check which has dimensions of about 2.75 inches by 6 inches. The financial institution, normally a bank in the ordinary course, provides to the depositor a supply of prenumbered checks which have the depositor's account number printed on them. As was discussed, this is prepared before the checks are distributed to the depositor. Once the depositor is provided with such checks, the checks are issued to a payee that the depositor selects and are encoded with the check sum. In this modified approach, the check sum is entered in three locations. The locations are at the third, fourth and sixth fields for entry of data. The check sum, once entered, markedly enhances the dispatch of the check through banking channels so that it is returned to the issuing bank. This is especially accomplished through the use of the present apparatus which represents a modification of the CPA equipment provided by Panasonic.

BENEFITS OF THE PRESENT SYSTEM

One of the benefits of the system which will be described below in detail is that the check writing system prints the check with an MICR entry which is the proof sum necessary for handling in the proof department. This check sum enables the checks to be appropriately handled. Moreover, the MICR ink is machine readable so that proofing can be accomplished with substantial reduction of handling while yet accomplishing proper entry of the charges to the account of the depositor. More specifically, an additional field is defined on the face of the check so that the check sum is entered in MICR readable ink. Ink which is readable by magnetically triggered equipment is preferred. To this end, the ink incorporates ferrous materials in it to assure a readable entry recognized in this fashion.

One important aspect of the present disclosure is the surprisingly simple approach by which the CPA device can be converted to provide this. In view of the fact that the cost of the services at the financial institution are markedly reduced, the financial institution and the depositor can both benefit by reduction of service charges.

DETAILED DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

Figure 1:
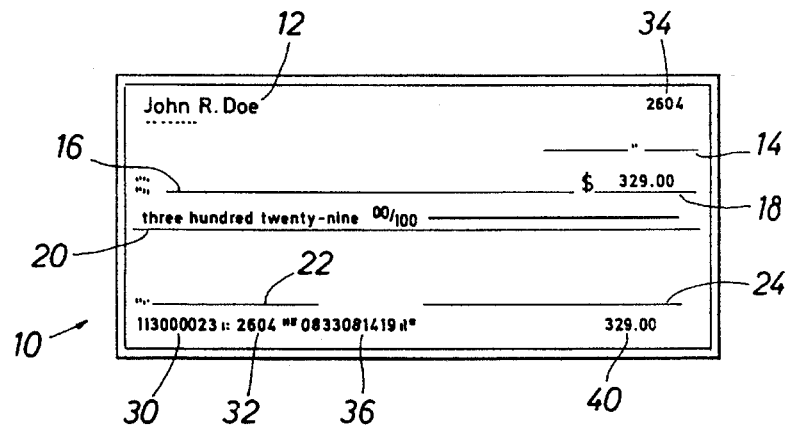
Figure 2:
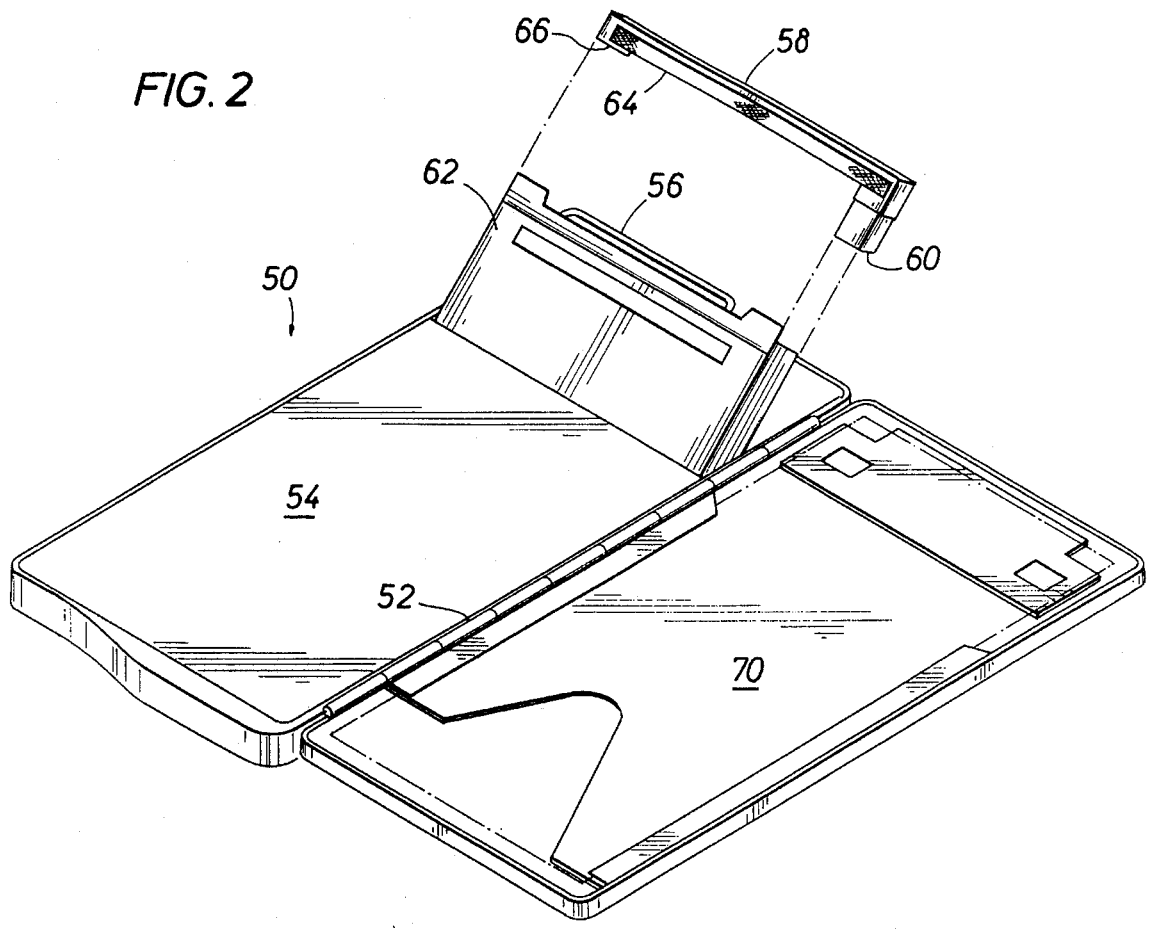

FIG. 1 shows the face of a check which is organized in accordance with the present disclosure and which includes several fields for entry of data as will be described; and FIG. 2 shows a check printing apparatus which has been opened to expose the printhead and removable carbon ribbon for easy replacement.

DETAILED DESCRIPTION OF THE PREFERRED EMBODIMENT

Attention is now directed to FIG. 1 of the drawings where the numeral 10 identifies the preprinted check form. This check form is preprinted in all regards and preferably has a conventional or standard size, one size being mentioned above. This representative size is more than satisfactory for the preprinted check 10. As appropriate, the check is preprinted with graphics at the upper left corner to identify the name of the depositor and other information. This is located at the upper corner at 12. There is a first field for entry of data which is on the line 14. This field of data is the date. The date is typed or printed in the field 14 in the fashion to be described. A second field of data is at the line 16 where the payee is entered. To conform with various state laws, the payee normally requires the name of the person or business entered at the line 16. This represents a second field of data. The third field of data is the Arabic amount which is entered on the line 18. That field of data is the amount to be paid. It is the check sum as that word of art was defined above. The fourth field of data is placed on the line 20 and is the check sum. The third and fourth fields differ in that the third field is provided in Arabic numeral form while the fourth data field is provided with the amount spelled as illustrated in FIG. 1. In this particular embodiment, the line 22 is the location for a fifth field and in this instance, that is preferably a memo regarding the nature of the payment or some other important information. The numeral 24 identifies a signature line. Below the signature line, the proof amount is the check sum entered. Before that is described fully however it needs to be located with respect to certain other entries.

One important number on the check is the bank number at 30. That is encoded when the checks are preprinted and is placed on the check in MICR form. The check number is incorporated at 32 and also in MICR ink and is machine readable. The check number 32 at the lower left corresponds the check number 34 which is written at the upper right. One difference between the two involves slight modifications in the type face for the check number, i.e. it is preferable to use the MICR form of the ten numerals so that they are readily read by the processing machinery. The numeral 36 identifies the depositor's account number. In a small bank, it might be only four or five digits while it can be nine digits in a larger bank. This however is a number which is written parallel or on the line with the bank number and check number. In other words, the numbers at 30, 32 and 36 are written substantially serially.

The proof number, one aspect of the present disclosure, is identified at 40 and it is written at the common line with the numbers 30, 32 and 36. It is set off to the right. There is ample room beneath the signature line 24 or the proof number. Even in the event that the signature is written in cursive fashion and is both above and below the signature line 24, it does not interfere with the MICR number entered at 40. This number is formed of MICR ink so that it can be read by that type of equipment. Hence, the actual appearance to the unaided human eye is not important. What is important is that the proof number of the check sum at the line or location 40 be identical numerically to numbers entered at the fields 18 and 20 previously discussed.

Ordinarily and in times past, the check sum was entered in the proof department of the bank by individual operators operating MICR equipment which types the MICR number on the check. The MICR number is the check sum. That process requires reading and is subject to human error. Moreover, that requires that the check be hand converted in the bank. This is expensive and increases the cost of bank operation.

One purpose of the present disclosure is to assure that the sixth field is provided with the check sum but that it is also written in MICR ink and is located on a line which is common with the entries 30, 32 and 36. The numbers at 30, 32 and 36 must be read in processing the checks automatically through the equipment maintained in the proof department. The type equipment readily reads the number entered at 40.

While the foregoing sets forth the check of the present disclosure and shows how it is formed and organized, one apparatus for making this check is the CPA equipment device just mentioned. More particularly, that equipment is arranged so that a keyboard is used by the depositor to prepare the necessary data for entry. In other words, the data is entered by the depositor who operates the keyboard so that the various fields of data are completed. The fields of data include the first field which is the date, the second field which is the payee, the third and fourth fields which are the check sum, and the fifth field which is the memo, as needed. The present procedure contemplates the addition of a sixth field which is the MICR entry of the check sum so that subsequent processing is more readily accomplished.

Attention is now directed to FIG. 2 of the drawings where the CPA device is shown. The device 50 has been opened so that the inner workings of the device are exposed. It is sized somewhat larger than the wallet sized check which is positioned in it. The two halves join at a piano hinge 52. A check is captured adjacent to an area 54. It travels lengthwise in the equipment. As it travels, it passes beneath a printhead 56. The printhead 56 is used to form printing on the face of the check. In addition, there is a removable printer ribbon assembly 58. The ribbon assembly incorporates an alignment pin 60 which plugs into a pivoted housing 62. A similar connection is made at the opposite end so that the ribbon carrier 58 is properly aligned. The ribbon 64 faces upwardly once the housing 62 is folded flat. In the illustrated solid line position of FIG. 2 of the drawings, the printhead has been rotated along with the housing 62 to show how the ribbon is removed and replaced. The ribbon on the ribbon cartridge 58 spools on a take up reel at the left end 66. The ribbon is stored there. Periodically, the ribbon is replaced. At the time of replacement, the ribbon cartridge 58 is pulled away from the housing 62 along the dotted line as indicated in FIG. 2 of the drawings and is removed. It is replaced in the equipment by simply pushing the ribbon cartridge down against the equipment so that the ribbon overshadows the printhead 56. The printhead 56 forms the necessary symbols or characters for reading. It is preferable that the ribbon 64 place ink on the check form 10 which is readable by MICR equipment. In ther words, this requires a ferrous pigment in the ink to assure reading by MICR equipment.

Through keyboard entries readily available to the user of the CPA printer 50, the data for the necessary fields are entered. This data includes the payee and the check sum. While date can be hand entered, it is also automatically generated. The preprinted check form includes the numbers located at 30, 32 and 36 when the check form is supplied. The check sum however is the important entry for the depositor and also the proof department. The check sum is entered by means of keyboard manipulation of the CPA device 50. This creates the necessary requisite Arabic numeral entry in the third field at 18. Likewise it creates the same numeric sum i.e., the check sum, and that is entered at the sixth field 40 in FIG. 1 of the drawings. The MICR ink ribbon 64 is used to print the number at 40. Indeed, MICR ribbon material is used for printing all aspects of the check on the face of the check. It is not necessary to change ribbons merely to provide the MICR ink at the field location 40. Rather, MICR ink can be used at all locations.

The blank check 10 is placed with the face directed upwardly on the platen 70. The printhead 56 is positioned opposite the face of the check 10. The check entries are created by keyboard or other operation of the CPA equipment. Then the user need only operate the CPA equipment to complete the check issuance transaction. When that occurs, the check is forced out of the housing of the CPA device as it traverses the equipment. The check passes beneath the printer and the data is entered by the printhead utilizing the ribbon 64. The required check sum, the amount of $329.00, is typed at the field location 18 and 20. Once this sum is entered at the field locations 40, the MICR entry for check proofing and processing at the issuing bank is complete. At that point, the check may be negotiated through conventional banking channels. It does not matter that it has to pass through several sets of hands. The depositor is able to create the MICR entry on the depositor's own initiative. This requires nothing extra of the depositor. Rather, it is executed in the check printing equipment of the present disclosure. It is processed by virtue of the CPA device 50 printing the check sum in the MICR proofing field at the location 40 on the face of the check 10.

In summary, the foregoing sets forth a method of using the above mentioned apparatus to print checks which are more easily proofed. A form of check has been set forth. A check printing process and apparatus of likewise has been disclosed. It is believed that banking transactions will be streamlined in accordance with the foregoing steps. Banking transactions involve deposit of the check at a foreign bank (meaning a bank which is remote from the issuing bank), which check ultimately arrives at the issuing bank. Credits and debits between the foreign bank and the issuing bank are settled in the bank to bank relationship and credits and debits to the individual accounts of the depositor are made.

While the foregoing is directed to the preferred embodiment of the present disclosure and includes methods of use thereof, the scope of the present invention is determined by the claims which follows.

I claim:

1. A method of issuing a check by a depositor in a bank wherein check processing of the issued check is done by MICR readers without requiring further entry of data on the check after issuance by the depositor, the process comprising the steps of:

(a) printing a set of checks with MICR characters representing the bank number, depositor account number, and check number wherein the MICR characters are aligned along a designated line of the check to enable reading of the MICR characters during processing at the bank;

(b) issuing one check by printing thereon the data, payee and check sum in conformance with banking laws to create a valid check obligation to pay check sum on the check when negotiated by the user, wherein the check issuer determines the check sum, date and payee at any time or place;

(c) printing the check sum in MICR readable characters on the check at the time of issue with a depositor controlled, hand held portable printer wherein the MICR characters are also aligned with the MICR characters representing the bank number, depositor account numbers and check number to enable reading of the MICR characters during processing at the issuing bank so that the issuing bank processing is fully accomplished in MICR characters on the check when the check is presented for payment; and (d) entering the depositor check sum to the depositor account stored in the printer.

2. The method of claim 1 including the step of printing the check sum in a field permitting check sum printing in Arabic numerals, spelling out the check sum in conformance with banking laws, and forming the check sum in Arabic numerals which are machine readable in MICR ink.

3. The method of claim 1 including the step of placing the check sum in MICR readable characters below the check signature line.

4. The method of claim 1 including the step of issuing the check by printing on the check aligned numbers including the bank number, check number, account number and check sum.

5. The method of claim 4 wherein the aligned numbers are aligned across the face of the check in a line below the signature line.

6. The method of claim 1 for issuing a negotiable check on the account of a depositor at a bank wherein the method utilizes a hand held portable check printing apparatus and including the steps of entering the payee, date and check sum in the portable apparatus, printing the check sum on the face of a blank check having preprinted enteries thereon including preprinted bank number, account numer and check number; and locating the check sum at a desired location on the face of the check, wherein the check is printed by a check printing ink source forming a legible and readable set of Arabic numerals to enable reading of the check sum by MICR processing equipment at the issuing bank.

7. The method of claim 6 wherein the portable check printing apparatus is provided with an unissued check, the check sum is input to the printing apparatus, and a printhead in the apparatus thereafter prints the check sum on the unissued check while moving the unissued check from the apparatus to enable depositor handling.

8. The method of claim 6 wherein the step of issuing the check includes the preliminary step of placing the unissued check in the apparatus, and enabling keyboard entry of the check sum by the apparatus.

9. The method of claim 6 including the step of printing the check sum in ferrous material in ink to enable check issuance and reading by MICR proofing apparatus.

10. The method of claim 9 further including the step of printing the check sum below the signature in a field location conforming with an industry standard.

11. The method of claim 1 wherein the depositor controlled portable printer prints MICR characters along the check wherein the signal line extends along the length of the check and the check is rectangular having a height and length acceptable for checks and the designated line is along the length of the check to enable printing serially as the check is printed with the MICR characters.

12. The method of claim 11 wherein the serial printing along the designated line provides MICR characters representing the bank number, depositor account number, check number and check amount to enable subsequent reading of the MICR characters.

13. The method of claim 12 wherein the depositor controlled portable printer also prints the check by printing the date, payee, and check sum at locations on the check in conformance with the banking laws to create a valid check obligation to pay the check sum wherein this step occurs in conjunction with the step of printing the MICR readable characters along the designated line on the check subject to depositor control.

14. The method of claim 13 further including the step of depositor input to the depositor controlled portable printer of the date, payee, and check sum.

15. The method of claim 14 wherein the step of issuing the check includes the step of removing one check from a set of similar blank checks in the portable printer subject to control by the depositor and printing only one check which moves the check from a stored location within the printer to a location on the exterior of the printer for subsequent negotiation by the depositor.

16. The method of claim 14 including the preliminary step of entering on the check printer at a keyboard thereof numbers representative of the check sum.

17. The method of claim 14 including the preliminary step of entering on the check printer at a keyboard thereof letters representative of the payee name.

* * * * *